Nov. 27, 1928.
O. A. DIETSCHE
1,693,139
CHANGE SPEED MECHANISM
Filed Jan. 12, 1927   3 Sheets-Sheet 1
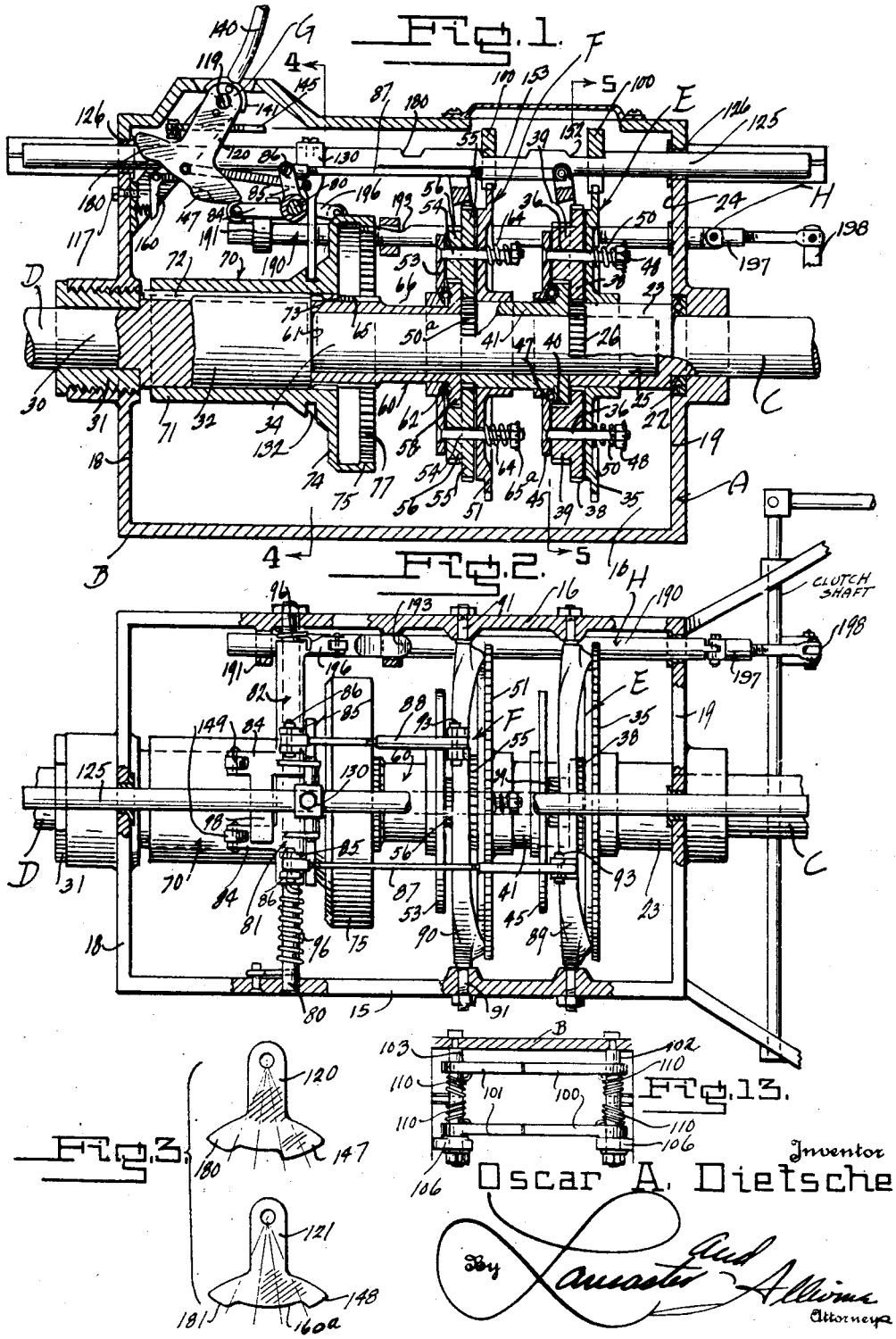

Nov. 27, 1928. 1,693,139
O. A. DIETSCHE
CHANGE SPEED MECHANISM
Filed Jan. 12, 1927 3 Sheets-Sheet 2
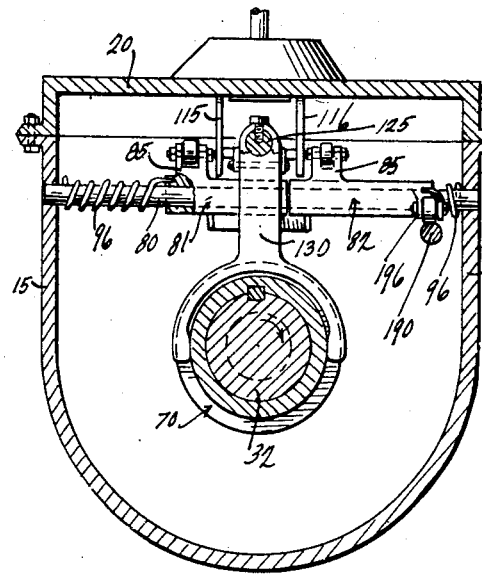
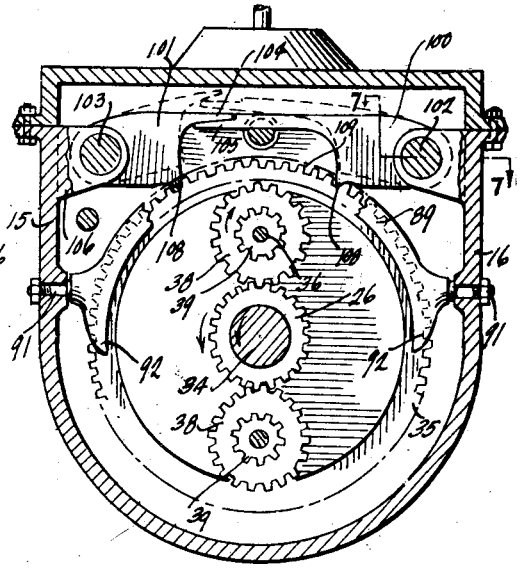
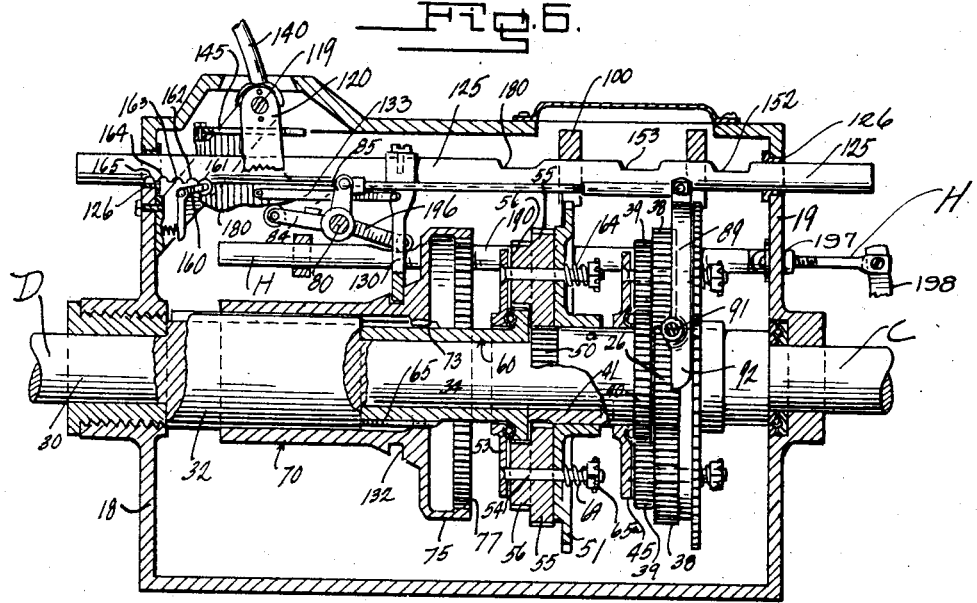
Inventor
Oscar A. Dietsche
By Lancaster & Allwin
Attorneys Nov. 27, 1928.
O. A. DIETSCHE
1,693,139
CHANGE SPEED MECHANISM
Filed Jan. 12, 1927
3 Sheets-Sheet 3
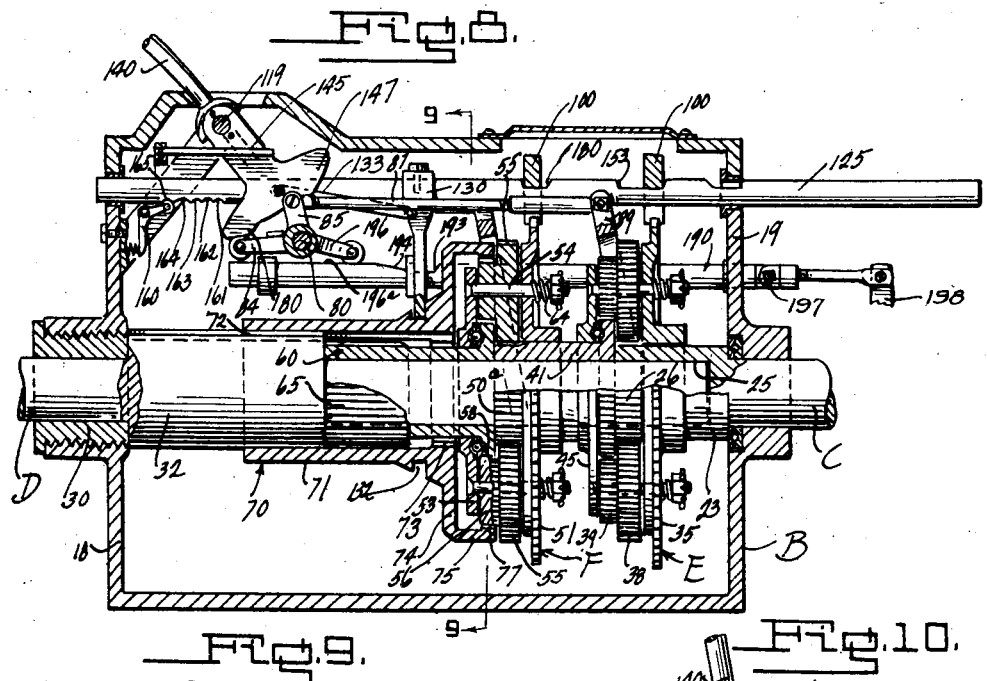
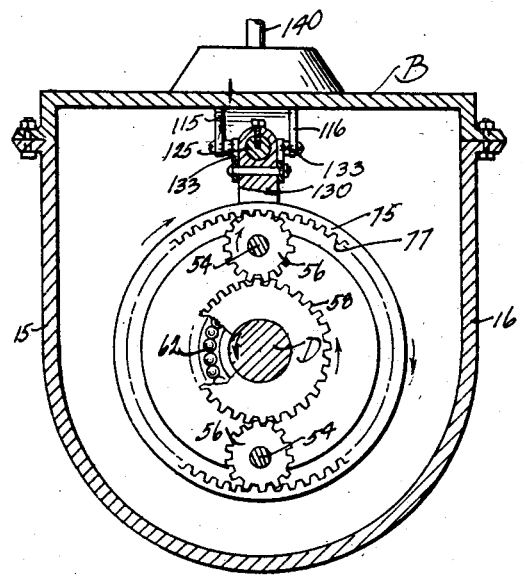
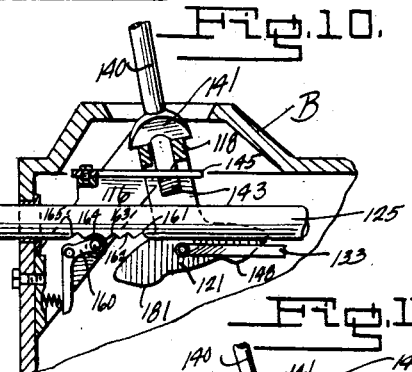
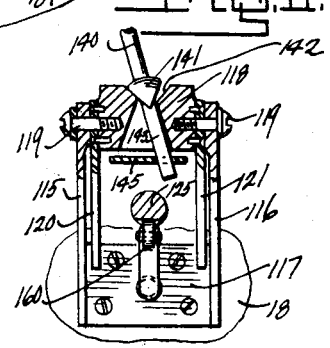
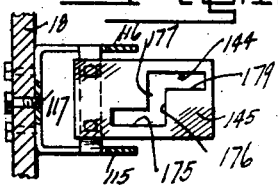
Oscar A. Dietsche Inventor
By Lancaster and Allwine
Attorneys Patented Nov. 27, 1928.

1,693,139

UNITED STATES PATENT OFFICE.

OSCAR A. DIETSCHE, OF LOS ANGELES, CALIFORNIA.

CHANGE-SPEED MECHANISM.

Application filed January 12, 1927. Serial No. 160,683.

This invention relates to improvements in transmission mechanisms.

The primary object of this invention is the provision of an improved transmission mechanism, of the planetary type, embodying means to substantially eliminate gear shifting, and enable a quick get-away from a standing start, without gear shifting operations.

A further object of this invention is the provision of an improved transmission mechanism including a selective manually operated gear shift, or a clutch operated gear shift.

A further object of this invention is the provision of an improved change speed mechanism which embodies means to drive a driven shaft at low, intermediate and high speeds, with a smooth flow of power, which eliminates the necessity of throttling down the engine when changing speed, and thereby enables a quick get-away, which is vitally essential under conditions of driving in traffic in large cities.

Other objects and advantages of this invention will be apparent during the course of the following detailed description.

In the accompanying drawings, forming a part of this specification, and wherein similar reference characters designate corresponding parts throughout the several views, Figure 1 is a substantially vertical sectional view taken longitudinally of the change speed mechanism, showing cooperating details of the gear mechanism, in low gear.

Figure 2 is substantially a plan view, partly in section, of details illustrated in Figure 1.

Figure 3 is a representation of two operating elements of the improved change speed mechanism, showing relative operative positions of the same, in dot and dash lines, with respect to other details to be subsequently described.

Figures 4 and 5 are sectional views taken substantially on their respective lines in Figure 1 of the drawings.

Figure 6 is a fragmentary sectional view of details illustrated in Figure 1, showing the gear mechanism in high gear.

Figure 7 is a fragmentary sectional view of detent mechanism showing various details of the mechanism, the view being taken substantially on the line 7—7 of Figure 5.

Figure 8 is a fragmentary sectional view of details of the gear mechanism, in reverse drive position.

Figure 9 is a sectional view taken substantially on the line 9—9 of Figure 8.

Figure 10 is a view of the operating mechanism of the invention, in neutral position.

Figure 11 is a sectional view taken thru the operating mechanism, showing more particularly control means.

Figure 12 is a sectional view showing a guide plate for receiving details of the operating mechanism for a purpose to be subsequently described.

Figure 13 is a view of clutch detent details.

In the drawings, wherein for the purpose of illustration is shown only a preferred embodiment of the invention, the letter A may generally designate the improved gear transmission mechanism, which may comprise a housing B; wherein is rotatably mounted drive and driven shafts C and D respectively. Speed reducing devices E and F are provided as part of the speed mechanism, in cooperating relation with respect to the drive and driven shafts C and D; operating mechanism G being provided for cooperation with the speed reducing devices E and F. Means H may be provided for cooperation with the means G to automatically operate the change speed mechanism by clutch operation of the vehicle.

The housing B is of any approved construction, including side walls 15 and 16, and end walls 18 and 19, and any approved removable cover construction 20.

The drive shaft C is the motor connected shaft, being rotatably mounted in suitable bearings 22 in the end wall 19 of the transmission mechanism B, and having a large hollow cylindrical portion 23, preferably integral therewith, located within the housing compartment 24, which has a socket 25 therein opening in the housing compartment 24. Adjacent its open socket end, externally thereon, the said portion 23 is provided with an annular gear or series of teeth 26, for cooperation with the speed reducing mechanism E to be subsequently described.

The driven shaft D extends longitudinally thru the housing compartment 24, bearing at one end 30 in a suitable bearing 31 provided in the end wall 18; the shaft D immediately inside of the compartment 24, adjacent the end wall 18, having an enlarged portion 32, integral or rigid therewith, and including a cylindrical end portion 34 also integral therewith, so that the free end thereof rotatably bears in the socket opening 25 on the end of the drive shaft C in the compartment 24, in the relation of parts illustrated in Figure 1 of the drawings.

Referring to the speed reducing mechanism E, the same includes a rotatable and slidable disc or clutch part 35, mounted for rotation on the portion 23 of the drive shaft C, or for rotation thereon and for longitudinal sliding thereon. This clutch part 35 is provided with shafts or pins 36 thereon, eccentric with respect to the drive and driven shafts C and D, which respectively support gear reducing wheels, each including a larger gear portion 38 rotatable on the respective pins 36, in meshing relation with the gear or teeth 26 of the drive shaft 23, and also each of the said wheels including a smaller gear portion 39 thereon, in meshing relation with an annular gear portion 40 located on the sleeve shaft 41 which is rotatably mounted upon the drive shaft portion 34 between the speed reducing devices E and F.

In connection with the device E a disc-like support member 45 is provided for the pins 36, which are preferably rigid therewith, and the device 45 has a thrust bearing 47 bearing against the gear portion 40. Each of the pins 36 is provided with a nut 48 on the outer end thereof at the opposite side of the clutch part 35 from the gear wheels; a spring 50 being provided on each pin 36 beween the nut 48 and the clutch part 35, and said springs being under compression to normally urge the disc-like clutch part 35 into a frictional clutching relation with the facing sides of the gear portions 38 of the respective gear wheels on the pins 36, and likewise the spring action moves the entire gear wheels on the pins 36 longitudinally therealong into a frictional clutching relation against the facing side of the disc portion 45.

The sleeve 41 has an annular series of gear teeth 50ª thereon, at the end thereof opposite the gear 40, to cooperate with certain gears of the speed reducing mechanism F to be subsequently described.

The mechanism F includes a clutch part 51, exactly similar to the clutch part 35, slidably longitudinally and rotatably mounted upon the sleeve 41, between the gears 40 and 50ª thereon. A disc 53 is rotatably mounted, as will be subsequently described, against longitudinal movement with respect to the driven shaft D, having pins 54 supported thereby, similar to the pins 36 above described, and on which pins 54 gear wheels are rotatably mounted, each of which includes a larger gear wheel 55, in meshing relation with the gear 50ª; and a smaller gear 56 integral or rigid with the wheel 55, meshing with a gear 58 concentric with the driven shaft D, and rigid with a shaft sleeve 60 rotatably mounted upon the driven shaft D between the gear 50ª and the shoulder 61 formed at the juncture of the portions 32 and 34 of the shaft D. The disc 53 of the means F, rotatably bears on the sleeve 60, and is held in anti-friction bearing relation on the gear 58, by means of an annular thrust bearing 62, such as illustrated in the drawings. Springs 64 are provided on the pins 54, between the heads 65 and the clutch part 51; normally urging the clutch part 51 towards the gear wheels comprising the gears 55 and 56; to force the latter longitudinally of their respective pins into frictional binding relation against the facing surfaces of the disc 53 and clutch part 51, as is quite apparent from the drawings.

The sleeve 60 is provided with an annular series of relatively long gear teeth 65 thereon, adjacent the shoulder 61, so that their forward ends are spaced to provide an annular smooth portion 66 between the disc 53 and the gear teeth 65; it being understood that the gear teeth 65 are raised from the surface 66.

A longitudinally slidable gear connecting member 70 is provided, including a sleeve portion 71 splined at 72 on the larger shaft portion 32 of the driven shaft D; and splined at 73 on the gear teeth 65; the gear connecting member 70 being so moved that the spline tooth 73 may be moved out of meshing relation with the gear teeth 65 into the space 66, to disconnect the sleeve 60 from the shaft portion 32, to effect neutral position, as will be subsequently described. As to the splined connection 72, the same may include a key carried by the shaft D operating in a groove of the longitudinally slidable gear connecting member 70. The gear connecting member 70 furthermore includes an annular flange 74, the outer periphery of which is provided with an annular flange 75 concentric with the shaft D having an internal gear 77 therein, in a relation to mesh with the operatively disposed gears 56 of the gear reduction device F, to effect a reverse drive of the gear mechanism, as will be subsequently described.

In connection with the operation of the discs 35 and 51 of the gear reduction devices, to release the frictional clutching action upon the gear wheels thereof, a shaft 80 is rotatably supported at the ends thereof in the walls 15 and 16 of the housing B, as illustrated in Figure 4 of the drawings; bell crank levers 81 and 82 being pivoted on the shaft 80 at opposite sides of the longitudinal axis of the transmission mechanism; each of said levers 81 and 82 including a lever arm 84 and a lever arm 85; the arms 84 and 85 being in a substantially V-shaped relation, as illustrated in Figures 1, 6 and 8 of the drawings. The lever arms 85 of the lever devices 81 and 82 respectively are hingedly connected at 86, at their outer ends with connecting rods 87, and 88, which respectively connect to operating forks 89 and 90 of the gear reduction devices E and F respectively. The devices 89 and 90 are of a formation substantially illustrated in Figure 5 of the drawings, each of the same being a substantially half-circle segment, pivoted at 91 in the side walls 15 and 16 of the housing, to provide lower fingers 92 projecting for operation on the gear facing sides of the discs 35 and 51; said segments 89 and 90, between the ends thereof, having the connecting rods 87 and 88 pivotally connected as at 93. Upon rocking of the lever 81 the clutch fork 89 is operated to move the disc 35 for compression of the spring 50 and releasing the clutching action on the gears of the reduction devices E, to permit rotation thereof on their respective pivot pins 36, and similarly upon operation of the lever device 82, thru the connecting rod 88 the fork 90 will be operated to similarly reduce the clutching action of the disc 51 of the gear reduction device F, by compressing the springs 64 and releasing the gears 55 and 56 to permit free rotation thereof on their respective pins 54. Spiral springs 96 are provided on the shaft 80, one for each lever 81 and 82, to urge the arms 85 forwardly.

As will be noted from Figure 2 of the drawings, the lever arm 84 of the lever device 82 is provided with a cross arm 98 which extends across the arm portion 84 of the lever device 81, so that upon rocking of the lever device 82, against tension of its spring 96, the cross piece 98 will move the lever device 81 also, so that whenever the lever device 82 is moved against tension of the spring 96, the operation of this single lever device will also operate the lever devices 81 and therewith will operate both forks 89 and 90 to throw out the clutch devices of the gear reduction mechanisms E and F. This is not true of the lever device 81, which functions independently against tension of the spring 96, without operating the lever device 82, and for a purpose which will be subsequently described.

Detent devices are provided for each of the discs 35 and 51, each of which, as illustrated in Figures 5 and 13, consists of a pair of pawls 100 and 101 respectively pivoted on pins 102 and 103; the free ends of the pawls 101 at 104 resting on the free ends 105 of the pawls 100, in order to insure a synchronous operation of the pawls of each detent device. The pins 102 and 103 are suitably carried by brackets 106 at the inner sides of the housing walls 15 and 16, and each of said pawls includes a pawl projection 108 adapted to cooperate on the teeth at the outer periphery on both the discs 35 and 51. Springs 110 are provided on the pins 102 and 103, as is well illustrated in Figure 7 of the drawings, in order to force the pawls or detent members 100 and 101 into a detent engagement with the teeth 109 as illustrated in Figure 5. While the spring arrangement for the pin 102 has been illustrated in Figure 7, it is also understood that a similar spring arrangement is provided for the pin 103 for the detents 101 thereon, after the manner illustrated in Figure 13 of the drawings.

Referring to the operating mechanism G, spaced brackets 115 and 116 are supported in the compartment 24, being secured at 117 on the inner side of the wall 18, and extending diagonally upward in spaced relation, and at their free ends horizontally pivotally supporting a handle securing shaft 118; the same having pin projections 119 at the ends thereof bearing in the arms 115 and 16. Rigid with the shaft 118 are depending spaced operating fingers 120 and 121. The operating fingers 120 and 121 are formed as individually shown in Figure 3 of the drawings, and are adapted for respective cooperation on the arm portions 84 of the lever devices 81 and 82, as will be subsequently described.

A control rod 125 is longitudinally slidable above the drive and driven shafts; being reciprocably supported in suitable bearings 126 in the end walls 18 and 19, as illustrated in various views of the drawings, and upon this rod 125, is a fork connection 130, operating loosely in a groove 132 in the gear connecting member 70, to enable a longitudinal shift of the latter, to effect various gear meshing operations. Suitable links 133 are pivotally connected at their forward ends upon the fork member 130, and at their opposite ends at the inner sides of the operating arms 120 and 121, so that upon movement of the said operating arms, thru the links 133, the rod 125 may be moved longitudinally for causing the member 70 to shift longitudinally of the driven shaft, to effect various gear meshing operations, as will be subsequently mentioned.

Referring to a description of the invention, for low speed operation of the driven shaft D, the handle 140 is brought forward. It is to be noted that the handle 140 has an integral or rigid head portion 141, having downwardly converging sides resting in a socket 142 in the top of the shaft 118, handle 140 below the portion 141 having a shank 143 cooperating in a guide groove 144 of a guide plate 145, in a relation to be subsequently mentioned. As above mentioned, for low speed the handle portion is pushed forwardly, towards the motor end of the transmission mechanism, and this of course moves the operating fingers 120 and 121 rearwardly. These fingers 120 and 121 upon the lower forward ends thereof are provided with cam projections 147 and 148 respectively, which operate on the rollers 149 at the free ends of the levers 84 of the lever devices 81 and 82 respectively, rocking the lever devices 81 and 82 so that the arms 84 move downwardly to pull the arm portions 85 rearwardly, to the position illustrated in Figure 1, and thru the connecting links 87 and 88 the clutch operating members 89 and 90 are rocked to push the discs 35 and 51 forwardly and release the clutching operation upon the gears carried by the pins 35 and 54 of the gear reduction devices E and F. This frees the gears 38, 39, 55 and 56 for free rotation on their respective pins 36 and 54, and at the same time the pawl levers 100 of the respective detent devices for the discs 35 and 51 drop into notches 152 and 153 respectively provided therefor in the rod 125, permitting said pawl arms 100 to drop, so that the projections 108 engage the teeth of the discs 35 and 51, to prevent rotation of said discs in one direction. Due to the free ends of the pawls 101 resting on the pawls 100, the former will also drop so that the projections 108 thereof engage the teeth of the discs 35 and 51 to prevent rotation in an opposite direction, as can readily be understood from Figure 5 of the drawings, so that while the clutch operation on the reduction gears is released, the clutch discs 35 and 51 are held against rotation, so that the gears 38, 39, 55 and 56 may rotate on fixed axes with respect to the drive and driven shafts. In this relation of parts the low speed drive of the driven shaft D is first thru the drive shaft C, then thru the reduction gears 38 and 39 thru the gear 26; then to the sleeve 41 by meshing of the gear 40 thereof on the gears 39; then to the reduction gears 55 and 56 by meshing of the gear 50ª of the sleeve 41 with the gears 55; then to the sleeve 60 by meshing of the gear portion 58 thereof with the reduction gears 56. In this low speed position the lever 140 has been moved so that the fork 130 will hold the gear connecting member 70 splined on and keyed to the shaft portion 32, and in this position the spline tooth 73 is also splined on the gear teeth 65, so that the sleeve 60 is effectually connected by the member 70 to the driven shaft D, and incident to the drive of the driven shaft thru the train of reduction gears as above mentioned, with the clutches of the devices E and F out, a low speed drive of the driven shaft D will be effected.

In order to go into intermediate or second speed, it is merely necessary to move the lever 140 rearwardly, and it is to be noted that means is provided to gauge the distance to move, in the provision of a spring urged detent 160, illustrated in Figures 6 and 8 of the drawings, which engages in a notch 161 for low speed; a notch 162 for intermediate speed; and a notch 163 for high speed. The notch 164 is provided for neutral; and as illustrated in Figure 8 of the drawings the roller of the spring urged detent 160 is in a notch 165 designating reverse speed position of the rod 125. For intermediate speed, the lever handle 140 is moved rearwardly, so that the detent disengages from the notch 161 and engages in the notch 162. During this movement the operating fingers 120 and 121 will be moved so that the finger 148 of the cam 121 will release the roller 149 of the lever member 82, permitting the roller 149 to ride upwardly into the recess 160ª in the lower marginal portion of the lever 121, and this enables the spring 96 of the lever 82 to move the lever 82 and push the link 88 forwardly to engage the fork member 90 with the clutch disc 51 and permit the springs 64 to push the disc 51 into frictional engagement with the gears 55, so that the gears 56 are moved along to engage the disc 53, and thus the gears 55 and 56 are held between the discs 35 and 51 in clutched relation therewith, so that they cannot rotate upon their respective pins 74, but must rotate bodily about the shaft D. At the same time as the handle 140 is so shifted, the rod 125 is moved so that the pawl 100 thereof rides out of the notch 153 and this elevates the pawl 100 and also the pawl 101 of the respective reducing mechanism F, permitting the disc 51 to rotate free of the pawl mechanism. The drive of the shaft D for second speed is then thru the driven shaft C; thru the reducing mechanism E as above described for low speed, and it is to be noted that the gears 38 and 39 of the mechanism E are free to rotate on their respective pins 36; free of clutching relation with the discs 35 and 45. The drive is then thru the sleeve 41, and the entire gear reducing mechanism F is then rotated about the drive shaft incident to the fact that the gears 55 and 56 are locked between the discs 51 and 54, so that the speed reduction is ineffective and the drive is direct from the sleeve 41, to the sleeve 60, thru the intermediary of the now locked speed reduction device F, which drive is then transmitted to the driven shaft D thru the gear connecting member 70 splined on the teeth 65 and shaft portion 32, as above described.

For high speed, the lever 140 is shifted rearwardly another notch until the detent 160 engages in the notch 163, and in this position, illustrated in Figure 6 of the drawings, the operating fingers 120 and 121 have both moved so that the respective cam portions 147 and 148 are free of operation on the rollers of the arms 84 of the lever devices 81 and 82, permitting the springs 96 to throw the forks 89 and 90 to permit the clutching of the devices E and F to engage and preventing rotation of the speed reduction gears of said devices on the respective pins 36 and 54, so that the drive for high speed is thru the shaft C, to the sleeve 41 thru the intermediary of the speed reduction device E, which now bodily rotates with the shaft C without any speed reduction, and the speed is then transmitted to the sleeve 60 thru the intermediary of the now clutched locked speed reduction mechanism F, without any speed reduction, and the driving transmitted from the sleeve 60 to the driven shaft D thru the splined gear connecting member 70 which has not as yet splined off of the teeth 65. During this high speed position it is to be noted that the rod 25 has been moved so that the pawl members 100 of both the speed reduction devices E and F have moved out of their respective notches 152 and 153, bodily lifting the detent means from the discs 35 and 51, so that the latter are free to rotate.

Upon further rearward movement of the handle 140, the detent 160 will move into the notch 164, and in this position the spline tooth 73 of the gear connecting member 70 has now moved off of the teeth 65 into the space 66 about the sleeve 60, so that the sleeve 60 has no geared connection with the driven shaft D; and consequently a neutral position is effected.

For reverse drive of the driven shaft D, it is necessary to now laterally shift the handle 140. This is occasioned for the reason that heretofore during the three forward speeds and neutral position, the shank 143 of the handle has been operating in the slot portion 175 of the guide groove 144, as seen in Figure 12, until at neutral position the shank 143 lies against the edge 176 in the guide groove, and thus it is necessary to laterally shift the handle 140, to move the shank 143 along the lateral portion 177 of the guide groove 144, and then upon continued rearward movement of the handle 140 to the position illustrated in Figure 8, the shank 143 is moved along the portion 179 of the guide slot 144. It is necessary to provide the offset 177 in the guide groove, for the reason that the operator may quickly go thru the various high speeds into neutral without liability of over-reaching into reverse. For this reverse position it is to be noted that the operating fingers 120 and 121 are moved forwardly, as illustrated in Figure 8, so that cam projections 180 and 181 thereon, which are preferably equal in degree, ride over the rollers of the respective lever devices 81 and 82, to depress the same and throw the clutches of the devices E and F out of clutching operation on the reduction gears 38, 39, 55 and 56, to permit said reduction gears to freely rotate on their respective pivot pins 36 and 54. At the same time it is to be noted, from Figure 8, that the pawl members 100 of the devices E and F respectively drop into slots 153 and 180, of the rod 125, which rod of course has been moved incident to its link connection 133, and the dropping of the pawls 100 permits the same to engage as above described upon the teeth of the clutch members 35 and 51, to hold the latter locked and insure a rotation of the reduction gears on their pivot pins, without liability of bodily rotation of the reduction gears about the driven shaft. The reverse position is illustrated in Figure 8 of the drawings, and in this position the gear connecting member 70 has been moved from a neutral position, until the ring gear 77 therein meshes on the teeth of the small reduction gears 56 of the gear reduction device F, and it is to be noted that the gear reduction member 70 is not now splined directly on the sleeve 60, but is still splined on the shaft portion 32 of the drive shaft D. The operation is thence from the drive shaft C, and into the freely rotatable reduction gears 38 and 39 incident to connection with the gear 26, and the sleeve 41 is rotated incident to mesh with the gears 39, and the reduction gears 55 and 56 are freely rotated on their respective pins due to meshing relation with the gear 50ᵃ of the sleeve 41, and incident to the meshing of the small reduction gears 56 with the internal gear 77 of the gear connecting member 70, the latter is rotated, and incident to its splined connection with the pivot shaft D, the latter is rotated reversely, at slow speed, since of course the connection of the internal gear 77 upon the small reduction gears 56 effects such reverse drive. It is to be noted that the reduction gear is effective to permit slow speed during the reverse drive as mentioned..

The above is a description of the manual operation of the change speed gearing, and it is to be noted that the same is planetary in scope. However, means is provided to effect an automatic gear shifting operation comprising means associated with conventional clutch mechanism of a vehicle to enable the vehicle to start from a standing position, at slow speed, and to progress into high speed, incident to clutch operation, with a smooth flow of power, characterized by the absence of jerks and shocks, now incident to driving of conventional automotive vehicles.

This means includes a reciprocating rod member 190 supported at one end in the wall 19 of the transmission housing, and extending into the transmission casing, and therein being slidably mounted in a lug 191, as is illustrated in Figure 2 of the drawings. This rod is provided with a recess 193 therein, facing upwardly, having a sloping cam edge 194 from the top edge 196ᵃ of the rod 125 to the bottom of the recess 193. The lever 82 above described is provided with a lever arm 196, as illustrated in Figure 2 of the drawings, having a roller on the end thereof, adapted to travel along the rod 190; the action of the spring 96 above described being to force the arm 196 against the top edge of the rod 190.

The slide rod 190 is provided with an adjustable connection 197 thereon, at the outer end thereof, to which a clutch connecting link 198 is pivoted.

As to automatic operation of the change speed mechanism, the handle lever 140 may always be positioned for high speed, as illustrated in Figure 6, and in this position when the car is standing still, the vehicle clutch will of course be thrown out when the engine is in operation. The engine may be speeded up to any speed desirable, and kept at such speed, and when the operator releases the controlling means to let the vehicle clutch engage, this moves the rod 190 farther into the transmission housing, while the roller of the arm 196 of lever 82 is still riding along the top edge of the rod 190, just before it has reached the inclined surface 194, and of course when the clutch is engaged, it is to be noted that a low speed drive will be accomplished, since when the roller of the arm 196 is in this position, the lever 82 has been rocked to a low speed position, and the lever 81 incident to the cross arm connection 98 is in low speed position, as illustrated in Figure 2, so that the clutches of the mechanisms E and F are disengaged and will permit the drive of the driven shaft D thru the low speed cycle above described, notwithstanding the handle 140 is set for high speed position, since the controlling element in this instance is the riding of the roller of arm 196 on the top edge 196$^a$ of the slide rod 190. It is to be noted that there is always some play in the clutch pedal after the clutch is fully engaged, and before the operator has fully released his foot from the pedal, the rod 190 is still moving into the transmission casing, and the roller of the arm 196 rides downwardly over the inclined face 194 of the slide 190, and as the same does so the lever 82 will be released, and the lever 81 also, as the cross arm 98 rises, bearing in mind that the handle 140 is set for a high speed position, and as the levers 81 and 82 pivot, the clutch disengagement of the speed reducing devices E and F slowly releases to permit a full engagement of said clutch devices of the speed reducing mechanisms E and F when the roller of the arm 196 is fully in the bottom of the recess 193. This is accomplished during a ride of the roller of the arm 196 along the inclined surface 194 of the slide rod 190, and it is to be noted that during this operation the pawl or detent devices of the speed reducing mechanisms or devices E and F are fully out of engagement, and bodily rotation of said devices during low and intermediate speed is prevented by the frictional engagement of the forks 89 and 90. Thus it can be seen that during the vehicle clutch shifting operation the transmission mechanism is moved thru the cycle of low, intermediate into high gear, without a manual handle operation, which will result in an even distribution of the effort, obviating jerking such as characterizes the operation of the ordinary speed mechanism.

Various changes in the shape, size, and arrangement of parts may be made to the form of invention herein shown and described, without departing from the spirit of the same or the scope of the claims.

I claim:

1. In a change speed mechanism the combination of a drive shaft, a driven shaft, a sleeve rotatable on the driven shaft, reduction gears geared with the drive shaft and sleeve for drive of the latter at a reduced speed ratio, means for clutching the gears in a locked relation with the sleeve and drive shaft for bodily rotation therewith, a second sleeve rotatable on the driven shaft, reduction gears in a geared relation with said sleeves, for drive of the second mentioned sleeve at a reduced speed ratio, means for locking the reduction speed gears with second mentioned sleeve for drive of the same at the same rate of speed, means for keying the second sleeve with the driven shaft including a shiftable member, and means for shifting the member to key or disconnect the second mentioned sleeve with respect to the driven shaft.

2. In change speed mechanism a drive member, a driven member, a disc rotatable and slidable on the drive member, a disc rotatable on the driven member, pins carried substantially parallel with but eccentric of the drive and driven members, reduction gears rotatable on said pins between the discs, spring means on the pins urging the discs into clutching relation with the reduction gears, each gear including a large gear geared with the drive member and a smaller gear geared with the driven member, and means to move the first mentioned disc to release the clutching effect of the discs upon said reduction gears.

3. In change speed mechanism a drive member, a driven member, a disc rotatable and slidable on the drive member, a disc rotatable on the driven member, pins carried substantially parallel with but eccentric of the drive and driven members, reduction gears rotatable on said pins between the discs, spring means on the pins urging the discs into clutching relation with the reduction gears, each gear including a large gear geared with the drive member and a smaller gear geared with the driven member, means to move the first mentioned disc to release the clutching effect of the discs upon said reduction gears, and detent means for releasably holding the first mentioned disc against rotation.

4. In change speed mechanism a drive member, a driven member, a disc rotatable and slidable on the drive member, a disc rotatable on the driven member, pins carried substantially parallel with but eccentric of the drive and driven members, reduction gears rotatable on said pins between the discs, spring means on the pins urging the discs into clutching relation with the reduction gears, each gear including a large gear geared with the drive member and a smaller gear geared with the driven member, means to move the first mentioned disc to release the clutching effect of the discs upon said reduction gears, detent means for releasably holding the first mentioned disc against rotation, a second driven member, and means for releasably keying the second driven member with the first mentioned driven member.

5. In change speed mechanism a drive member, a driven member, a disc rotatable and slidable on the drive member, a disc rotatable on the driven member, pins carried substantially parallel with but eccentric of the drive and driven members, reduction gears rotatable on said pins between the discs, spring means on the pins urging the discs into clutching relation with the reduction gears, each gear including a large gear geared with the drive member and a smaller gear geared with the driven member, means to move the first mentioned disc to release the clutching effect of the discs upon said reduction gears, detent means for releasably holding the first mentioned disc against rotation, a second driven member, means for releasably keying the second driven member with the first mentioned driven member for drive in the same direction as the drive member, and means associated with said last mentioned means and with the first mentioned driven member for driving the second mentioned driven member in a reverse direction to the drive of the drive member.

6. In a transmission mechanism a housing, a drive shaft, a driven shaft, a plurality of speed reducing mechanisms for connecting the drive and driven shafts, including clutch means to connect the drive and driven shafts for direct drive of the latter, means to maintain said plurality of speed reducing mechanisms inoperative for direct drive of the driven shaft with the drive shaft, means associated with the driven shaft and one of said speed reducing mechanisms for effecting a reduced speed reverse drive of the driven shaft thru the drive shaft, means for manually operating the last mentioned means and the reduction speed mechanisms for effecting various forward and reverse drives, and means for automatically shifting the speed drive of the driven shaft from the drive shaft thru the various forward speeds.

7. In transmission mechanism the combination of a housing, drive and driven shafts rotatably supported by the housing, a plurality of reduction gears intermediate the drive and driven shafts in geared relation therewith, clutch means normally acting to lock said gears for bodily rotating the drive and driven shafts, an operating rod, means connecting the last mentioned means with said operating rod to selectively release the clutch means of said reduction gears, detent means to hold said gearing against bodily rotation with the drive and driven shafts, and a rod movable with said operating member, said rod being formed to throw the detent means into locking relation with the speed reduction gearing when the clutch thereof is released.

8. In transmission mechanism the combination of a housing, drive and driven shafts rotatably supported by the housing, a plurality of reduction gears intermediate the drive and driven shafts in geared relation therewith, clutch means normally acting to lock said gears for bodily rotating the drive and driven shafts, an operating rod, means connecting the last mentioned means with said operating rod to selectively release the clutch means of said reduction gears, detent means to hold said gearing against bodily rotation with the drive and driven shafts, a rod movable with said operating member, said rod being formed to throw the detent means into locking relation with the speed reduction gearing when the clutch thereof is released, and means for automatically operating the clutch releasing means independent of said operating member.

9. In change speed mechanism a drive shaft, a driven shaft, a frame for rotatably supporting the drive and driven shafts, reduction gearing, a clutch device having a rotatable reduction gear thereon eccentric with the drive and driven shafts and geared with the drive and driven shafts for reduced speed drive of the driven shaft from the drive shaft, means normally clutching the reduction gears to make the same bodily rotated with the drive and driven shafts to prevent a reduced speed drive of the driven shaft, an operating member for movement to release said clutch effort on said reduction gears, a shaft, a substantially bell crank lever oscillatively mounted on the shaft, a link connecting said operating member with said bell crank lever, and means for operating upon said bell crank lever.

10. In change speed mechanism the combination of a frame, a drive shaft rotatably carried by said frame having a gear keyed thereon, a driven shaft rotatably supported by said frame, a sleeve rotatably supported on the driven shaft having a gear thereon, a member rotatable about the axis of the driven shaft having pins eccentric thereon with respect to the driven shaft, reduction gearing rotatable on said pins including gears of different size in geared relation with the gears of the drive shaft and sleeve, means to lock said gears against rotation so that they must bodily rotate with the drive shaft and sleeve, means to release said last mentioned means to permit free rotation of said reduction gears on their respective pins, an operating rod on the frame, a detent, and means for operating the rod to move the detent into or out of retaining relation with respect to said member rotatable about the axis of the driven shaft.

11. In a transmission a drive shaft, a driven shaft, means rotatably supporting the drive and driven shafts in independently rotatable relation, a sleeve rotatable on the driven shaft, a second sleeve rotatably mounted on the driven shaft, a member slidably splined on the driven shaft and with the second sleeve, the splined connection of the said last mentioned member with the second sleeve being such as to permit the same to be disconnected when the splined connection of said member with the driven shaft is not disconnected, speed reduction means geared with the drive shaft and first mentioned sleeve, speed reduction means geared with the first and second mentioned sleeves, and means to independently and selectively operate the speed reduction means with the respective members with which they are geared for bodily rotation about the axes of the drive and driven shafts in a non-speed reducing drive.

12. In a transmission, a drive shaft, a driven shaft, means rotatably supporting the drive and driven shafts in independently rotatable relation, a sleeve rotatable on the driven shaft, a second sleeve rotatably mounted on the driven shaft, a member slidably splined on the driven shaft and with the second sleeve, the splined connection of the said last mentioned member with the second sleeve being such as to permit the same to be disconnected when the splined connection of said member with the driven shaft is not disconnected, speed reduction means geared with the drive shaft and first mentioned sleeve, speed reduction means geared with the first and second mentioned sleeves, means to independently and selectively operate the speed reduction means with the respective members with which they are geared for bodily rotation about the axes of the drive and driven shafts, in a non-speed reducing drive, said member splined on the driven shaft having a gear thereon for intermeshing with the gear reduction means of said second sleeve with the said member out of splined connection with the second sleeve and in a splined connection with the driven shaft for drive of the latter in a reverse speed.

OSCAR A. DIETSCHE.